Patented Aug. 14, 1923.

1,465,138

UNITED STATES PATENT OFFICE.

HARAI R. LAYNG, OF SAN FRANCISCO, CALIFORNIA; HATTIE F. LAYNG ADMINISTRATRIX OF SAID HARAI R. LAYNG, DECEASED.

WET CHLORIDIZING VOLATILIZATION PROCESS.

No Drawing. Application filed November 19, 1920. Serial No. 425,158.

*To all whom it may concern:*

Be it known, that I, HARAI R. LAYNG, a citizen of the United States, residing at the city and county of San Francisco, and State of California, have invented new and useful Improvements in Wet Chloridizing Volatilization Processes, of which the following is a specification.

My invention relates to chloridizing volatilization methods for treating ores, compounds or mixtures thereof, hereinafter referred to as "ore", which ore contains a valuable element or elements hereinafter referred to as "values".

The objects of my invention are to provide means for reducing inefficiencies due to dust losses in crushing and to dusting in roasting; to provide a means for obtaining a thorough mixture of chloridizing agents and ore, thereby reducing to a minimum the amount of excess chloridizing agent required; to provide a means for obtaining more complete chloridization of the values, and to provide a means for reducing the amount of work to be performed by the volatilization furnace. Any or all of these objects will increase the extraction and generally render chloridizing volatilization more efficient.

Heretofore in attempts to conduct chloridizing volatilization the ore has usually been dry crushed or ground and the chloridizing agent has been added in a solid form. The cost of dry crushing is considerably greater when compared with wet grinding and annoyance from dust and the losses resulting are considerable. The result of adding the chloridizing agent in a solid form is that a large excess has to be used in order to obtain good results, that the chloridizing agent is not thoroughly mixed in the ore, that little or no chloridization of the values takes place before the ore is heated in the furnace, and that considerable dusting takes place when the ore is heated in the furnace, which dusting means additional cost.

I have found by adding the chloridizing agent to the ore in the form of a solution, that the amount of dusting is greatly reduced, if not entirely eliminated; the amount of chloridizing agent required is greatly reduced, and the chloridization is greatly increased. I have found in the case of some ores, like for example certain oxidized lead ores, that by treatment with a chloridizing agent in solution, as for instance, a calcium chloride solution before the ore is fed to the furnace, that the values are almost completely chloridized before the ore is fed to the furnace and that higher extraction of the values is more readily obtained when the ore is so treated than when the ore is treated by other methods.

In this process ores which have to be ground, and which do not require roasting before chloridization, may be ground in a chloridizing solution, like for example calcium chloride solutions containing a little sodium chloride to aid settlement and to make up for small losses of the other chloridizer if necessary. Other chloridizers with or without the addition of sulphuric acid could of course be used in this process. The solution may be heated if desired. The ore may be separated from the solution if desired by any suitable means, such as by decantation or filtration. The decanted solution in many cases will contain dissolved values which may be recovered by any suitable means, such as by precipitation with lime, and the so treated solution can be reused in grinding other ore. (In the case of an oxidized silver, lead, copper ore, the decanted solution contained over 50% of the lead and appreciable amounts of both the silver and copper which were contained in the ore.) The mixture of ore and solution may be further freed from any undesired surplus solution by treatment in a drier which may be heated by means of flue gases from the furnace if desired. The ore containing some moisture and chloridizer can be fed to any suitable furnace to volatilize the values. The so volatilized values can then be conducted by means of flues to the drier if a drier is used and to any suitable recovery system to recover the volatilized values, for example the gases may be conducted to the base of a tower loosely filled with a filling, like for instance limestone, down through which filling trickles a solution of calcium chloride or the like. The ascending gases on contact with the filling and the descending solution are freed from their values, as well as any other chlorine compounds, which values are recovered by removing the solution and any suspended values held therein, and treating the so removed solution by any suitable means to recover the values. The solution may then be used in grinding the ore, or for other purposes. Other recovery devices may be used with this process, for instance devices like bag houses or electrostatic precipitators.

An example of one manner of conducting this process on an oxidized lead silver ore will be as follows:

The ore is ground in a calcium chloride solution containing a little sodium chloride and the resulting pulp is treated in thickeners to remove the surplus solution. The surplus solution is then treated with lime to precipitate the lead and silver, and the precipitates then smelted with carbon and a flux-like lime, if desired to recover bullion and calcium chloride. The so treated surplus solution can then be used in treating other ore. The thickened pulp is delivered to a drier where any undesired surplus moisture is removed. Considerable further chloridization of the lead and silver is accomplished in the drier. The so treated ore is then fed to a furnace where chloridization is practically completed and the chloridized values are volatilized as well as is any excess chloridizer or chlorine. The volatilized chlorides are conducted along with the gases or the products of combustion from the furnace to the above mentioned drier where the available heat or part thereof is utilized to remove any unnecessary excess surplus moisture from the pulp. The gases are then further cooled and directed by a fan to the absorption tower, where the chlorides of the lead and silver are dissolved or taken up by the calcium chloride solution. This solution is collected in the base of the tower and is drawn off, whilst the products of combustion are allowed to escape.

The solution containing the chlorides of silver and lead is treated with lead to precipitate the silver and the so precipitated silver is removed and recovered. The remaining solution is treated with lime to precipitate oxychloride of lead and calcium chloride is regenerated. The precipitated oxychloride of lead is removed from the solution and smelted with lime, whilst the carbon solution is added to the circuit to treat other ore, and the calcium chloride resulting from the smelting is used to treat new ores.

It is obvious to those skilled in the art that the solution and chloridizing agent may be added to the ore either before or after grinding; that the ore may be roasted before the addition of the chloridizing solution; that just sufficient chloridizing solution to enable good results may be added to the ore, or that a surplus may be added to the ore and the surplus may be removed and re-used either with or without treatment to recover dissolved values; further that the process is of such a nature that it may be modified along obvious lines without departing from the spirit hereof.

Having thus described my invention, what I claim and desire to secure by Letters Patent is—

1. In a method of chloridizing volatilization the steps which consist in grinding the ore in a chloridizing solution, removing the surplus solution, precipitating the dissolved values from the solution, and then subjecting the ore to a temperature sufficient to volatilize the remaining values.

2. In a method of chloridizing volatilization, that step which consists of grinding the ore in a chloride solution.

3. A method of chloridizing volatilization which consists of grinding the ore in chloride solution, removing the surplus solution and heating the ore and remaining solution to volatilize the values.

4. A method of chloridizing volatilization which consists in leaching the ore with a chloridizing solution, separating the ore and the solution, treating the solution to recover the dissolved values, treating the resulting ore to volatilize the values, and treating the so volatilized values to recover the same.

5. A method of chloridizing volatilization which consists of treating the ore with a chloridizing solution, separating the ore and the solution, drying the resulting ore and then subjecting the ore to sufficient temperature to volatilize the values.

6. A method of chloridizing volatilization which consists in subjecting the ore to a chloridizing solution to leach the ore to remove a part of the values, and then subjecting the ore to a temperature sufficient to volatilize the remaining values.

HARAI R. LAYNG.